US008284910B2

(12) United States Patent
Tovino (10) Patent No.: US 8,284,910 B2
(45) Date of Patent: *Oct. 9, 2012

(54) ACCEPTANCE OF INPUTS FROM VARIOUS INTERFACES TO A TELEPHONY SYSTEM

(75) Inventor: Michael S. W. Tovino, Sandy, OR (US)

(73) Assignee: ShoreTel, Inc., Sunnyvale, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/247,789

(22) Filed: Oct. 8, 2008

(65) Prior Publication Data
US 2009/0028315 A1    Jan. 29, 2009

Related U.S. Application Data

(63) Continuation of application No. 10/807,967, filed on Mar. 23, 2004, now Pat. No. 7,450,703.

(51) Int. Cl.
 H04M 15/00 (2006.01)
 H04M 11/00 (2006.01)
 H04M 3/00 (2006.01)
(52) U.S. Cl. ............. 379/114.01; 379/93.01; 379/93.11; 379/100.12; 379/188; 379/198
(58) Field of Classification Search ............. 379/118, 379/120, 121.01, 121.02, 121.03, 127.01, 379/127.03, 127.05, 130, 144.01, 144.05, 379/93.02, 93.11, 100.12, 194, 93.03, 114.01, 379/188, 198
See application file for complete search history.

(56) References Cited

U.S. PATENT DOCUMENTS

| 5,325,421 | A | | 6/1994 | Hou et al. |
|---|---|---|---|---|
| 5,406,619 | A | * | 4/1995 | Akhteruzzaman et al. ............... 379/93.02 |
| 5,475,740 | A | * | 12/1995 | Biggs et al. ............... 379/91.02 |
| 5,675,704 | A | | 10/1997 | Juang et al. |
| 6,137,877 | A | * | 10/2000 | Robin et al. ............... 379/352 |
| 6,195,420 | B1 | | 2/2001 | Tognazzini |
| 6,385,655 | B1 | * | 5/2002 | Smith et al. ............... 709/232 |
| 6,674,457 | B1 | * | 1/2004 | Davies et al. ............... 348/14.01 |
| 6,792,086 | B1 | | 9/2004 | Saylor et al. |
| 2003/0091172 | A1 | * | 5/2003 | Tiliks et al. ............... 379/126 |
| 2006/0171519 | A1 | * | 8/2006 | Shaffer et al. ............... 379/215.01 |
| 2006/0251227 | A1 | | 11/2006 | Tiliks et al. |

* cited by examiner

Primary Examiner — Binh Tieu
(74) Attorney, Agent, or Firm — Patent Law Works LLP (57) ABSTRACT

A telephony system that accepts inputs, such as account codes, from a variety of devices and interfaces. The system includes a server with a telephony management software (TMS) unit, a telephony application programming interface (TAPI) unit, and an application unit. The application unit includes a control module, a call status module, an endpoint interface module, a storage interface module, a call transfer module, a TAPI interface module, a configuration module, and an extension library module. A server is capable of prompting several devices for an input and then accepting an input from any of the devices. Thus, a server enables a user to initiate a phone call on one device and then input information using a different device.

45 Claims, 5 Drawing Sheets

ACCEPTANCE OF INPUTS FROM VARIOUS INTERFACES TO A TELEPHONY SYSTEM

CROSS REFERENCE TO RELATED APPLICATIONS

This application is a continuation of U.S. patent application Ser. No. 10/807,967, titled "Acceptance Of Inputs From Various Interfaces Of A Telephony System," filed Mar. 23, 2004 which is incorporated by reference herein in its entirety.

TECHNICAL FIELD

This invention relates generally to distributed telephony, and more particularly, to servers that accept client inputs from various interfaces and devices.

BACKGROUND

Enterprises often have several offices or call centers that are located in a plurality of locations. To interconnect all of these sites, enterprise telephony systems have been developed. Enterprise telephony systems, which consist of a distributed set of voice switches and servers, offer enterprise applications enabled by the integration of computer systems with telephony services. The software that supports the computer-integrated functionality is generally implemented as a client-server environment in which the participants or clients (distributed telephony users) communicate directly with the server. Computer-integrated features rely not only on a server's application platform but also on the availability of the network that connects the switches, server, and application services.

Account codes are one example of an enterprise application. Account codes enable an enterprise to restrict phone calls made by employees and to associate phone calls with various entities, such as customers. This is accomplished by requiring a telephony user to enter an account code before his call can be completed. Once a phone call has been associated with an entity, the enterprise can use this information, for example, to track time spent communicating with customers or to bill customers for phone calls. Depending on the situation, a phone call may require an account code or an account code may be optional.

In general, account codes are implemented as follows: A user initiates a phone call, thereby generating a phone call request. A server receives the request and determines whether an account code is necessary or optional for the phone call. If an account code is necessary or optional, the server prompts the user for an account code. In addition, if an account code is necessary, the server flags the phone call accordingly. The phone call is completed once the user has entered a valid account code. The phone call may also be completed if an account code is optional and the user has declined to enter an account code.

A user may initiate a phone call using any of a variety of devices. Each of these devices is different and has its own advantages and disadvantages for the user to initiate a conversation. These devices include both endpoints, such as analog phones, Internet-Protocol (IP) based phones, and software phones (softphones), and software applications that control these endpoints. These software applications, sometimes known as call managers, run on computers and offer users an interface through which the users may perform call-related functions such as transferring calls, placing calls on hold, and obtaining caller ID information, in addition to initiating calls.

Assume that a user initiates a phone call using a first device, such as an endpoint that will be used during the phone call. Traditionally, if the user wants to enter an account code, the account code must be entered using the first device. However, the user may prefer to use a second device to enter the account code, such as a call manager that has a user interface that enables the user to enter a name associated with an account code (e.g., a customer name) rather than the account code itself. Similarly, a user who has initiated a call using a call manager may wish to enter an account code using an endpoint. Traditional enterprise telephony systems require a user to enter an account code using the same device that was used to initiate the phone call.

What is needed is a system and method that enables a user to enter an account code using a device other than the device that was used to initiate the phone call.

SUMMARY OF THE INVENTION

Computer-integrated functionality is implemented using a server in a distributed telephony environment. The server includes a telephony management software (TMS) unit, a telephony application programming interface (TAPI) unit, and a computer-integrated functionality unit. The server is coupled to one or more endpoints, such as analog phones, IP-based phones, and software phones. The server is also coupled to one or more software applications that control these endpoints. These endpoints and software applications may be used to input information into the telephony system that will then be associated with a call. Examples of such information are account codes and authorization codes. The server is also coupled to a storage device that stores such information.

When a server receives a request to make a call, it determines whether information may be associated with the call. If information may be associated with the call, the server sends a signal to the device that initiated the call and a signal to the endpoint or software application that is associated with this device. The signals cause the device and the associated endpoint or software application to prompt a user for input. The user may then input the information using either the device or the associated endpoint, regardless of which was used to initiate the call. The server then receives the information and determines whether it is valid. If it is, the server attaches the information to the call and completes the call.

Further features of the invention, its nature, and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

For simplicity purposes, the invention is described in the context of inputting account codes into a telephony system. However, the invention may be used to input any type of information into a telephony system, such as authorization codes and numbers for navigating automated message systems.

A. System Architecture

Figure 1:
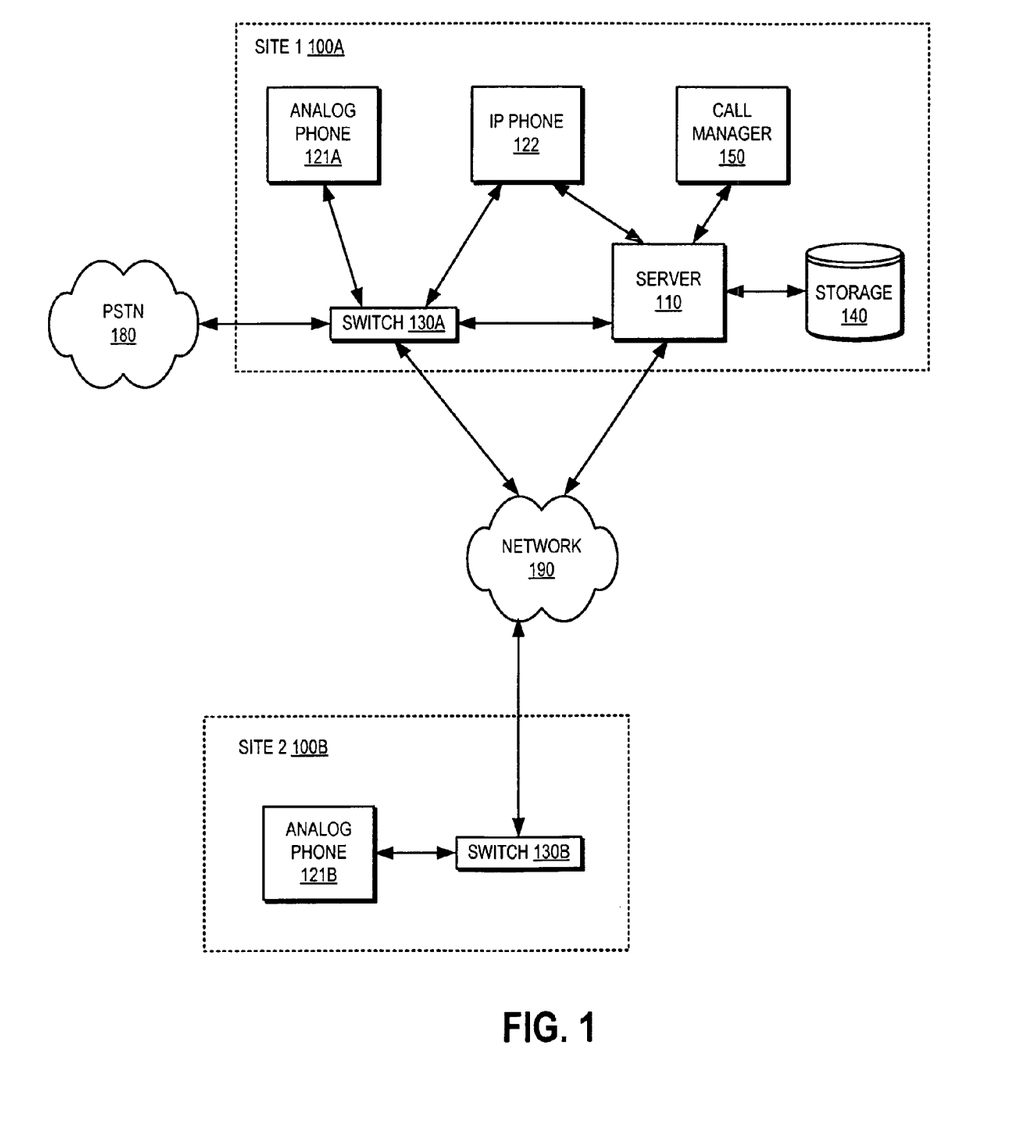
FIG. 1 is an illustration of an exemplary distributed telephony system architecture according to one embodiment of the present invention having two sites.

FIG. 1 is an illustration of an exemplary distributed telephony system architecture according to one embodiment of the present invention having two sites. The illustrated embodiment includes a first site 100A and a second site 100B. As used herein, a site represents a grouping of resources. In the illustrated embodiment, each of the two sites 100A, 100B is communicatively coupled via a network 190. One skilled in the art will note that sites 100A, 100B can be physically distinct from each other or merely topology-related groupings that are not in physically distinct locations. The system architecture in FIG. 1 is used only by way of example. While FIG. 1 illustrates two sites, the present invention applies to any system architecture containing one or more sites.

The first site 100A includes a server 110, a switch 130A, two endpoints (analog phone 121A and IP phone 122), a device running a call manager software application 150, and a storage device 140. The switch 130A represents a Voice over Internet Protocol (VoIP) device to which a number of endpoints (e.g., telephone devices) can be coupled, such as analog phones, IP phones, and software phones. In the illustrated embodiment, the switch 130A is coupled to the network 190. The switch 130A is also coupled to the public switched telephone network (PSTN) 180 via an analog or digital trunk line (e.g., a T1 or E1 interface). In the illustrated configuration, the switch 130A provides an interface for calls originating from or terminating on the PSTN 180.

An endpoint enables a user to carry on a phone call. Although in the illustrated embodiment the first site 100A has two endpoints (one analog phone 121A and one IP phone 122), in other embodiments the first site 100A has different numbers of endpoints and different types of endpoints, such as software phones (softphones). An endpoint is coupled to a switch 130, a server 110, or both. An endpoint has a user interface to send data to and receive data from a user. In one embodiment, this interface enables a user to specify an account code based on an account name and also enables a user to search for an account code or account name. A set of account codes and names to search may be accessed through the server 110 or it may be stored on the endpoint itself.

The analog phone 121A has, for example, a Telephone User Interface (TUI) that sends data through a speaker and receives data through a microphone and a keypad. The IP phone 122 has, for example, both a TUI and a graphical user interface that sends data through a display device associated with the IP phone 122. In one embodiment, the IP phone's graphical user interface also receives data from a touchscreen display device associated with the IP phone 122. A softphone (not shown) has, for example, a software application that runs on a computer and sends data through a display device and a speaker and receives data through a microphone, a keyboard, and a pointing device.

A device running a call manager software application 150, such as a computer, controls one or more endpoints with which it is associated. The call manager 150 offers a user an interface through which the user may perform call-related functions such as initiating calls, transferring calls, placing calls on hold, and obtaining caller ID information.

Figure 5A:
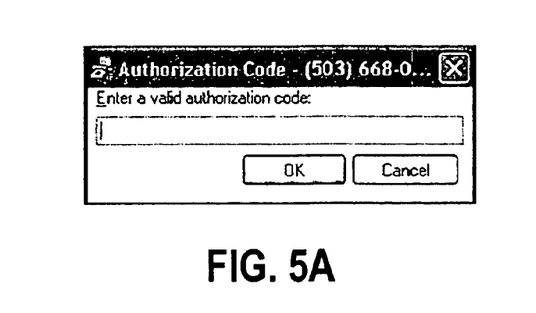
FIGS. 5A, 5B, and 5C are graphical user interfaces of a call manager, according to one embodiment of the present invention.
Figure 5B:
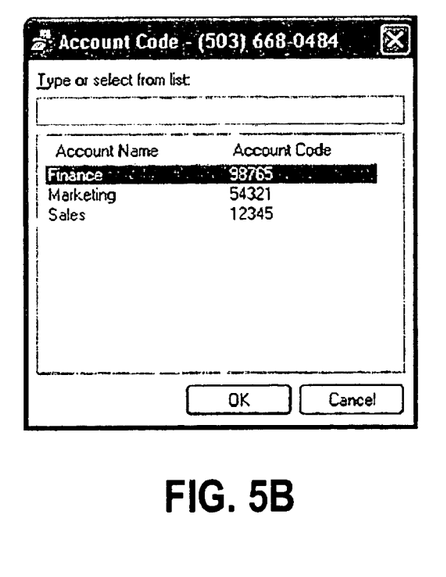
Figure 5C:
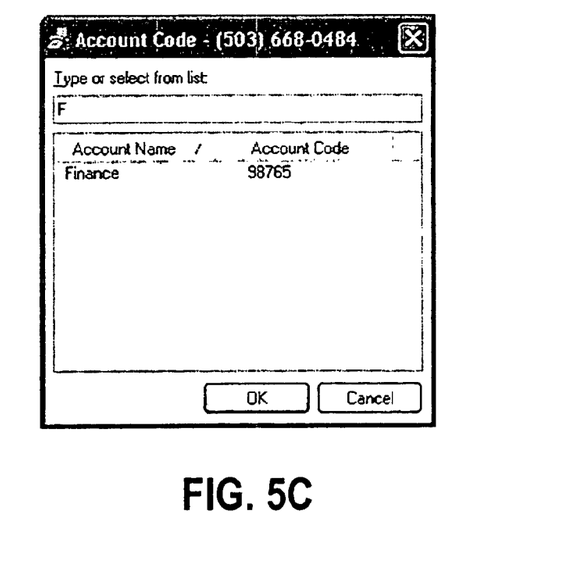

In one embodiment, the call manager 150 enables a user to enter an account code that will be associated with a phone call. FIGS. 5A, 5B, and 5C are graphical user interfaces of a call manager, according to one embodiment of the present invention. In one embodiment, such as the embodiment shown in FIG. 5A, a user may enter an account code. In another embodiment, such as the embodiment shown in FIG. 5B, a user may choose an account code from several displayed account codes, account names, or pairs of account code and account names. If the list of possible account codes or account names is large, the user may filter the list by typing in one or more characters of the desired account code or account name, as illustrated in FIG. 5C. The device running the call manager 150 may access the set of account codes and names through the server 110 or it may store this information itself.

Although in the illustrated embodiment the first site 100A has only one call manager 150, in other embodiments the first site 100A has a different number of call managers 150. Also, more than one call manager 150 may control the same endpoint. The association between a call manager 150 and an endpoint that it controls is accessed through the server 110.

The server 110 is configured to implement features or functions of the present invention. The server 110 is coupled to the network 190 and may also be coupled to one or more endpoints, such as IP phone 122. The server 110 will be further discussed below with reference to FIGS. 2-4.

The storage device 140 contains account code information, including account codes and the names of customers associated with the account codes. In the illustrated embodiment, the storage device 140 is coupled to the server 110. In an alternate embodiment, the storage device 140 is coupled to the network 190.

One skilled in the art will appreciate that additional networking devices can be added to the first site 100A, for example, if needed to support additional endpoints, servers, or other systems. For example, the first site 100A may include a second switch and an edge router to couple the first site 100A to the network 190 and to provide local area connectivity for the first and second switches. One skilled in the art will also recognize that numerous configurations of switches and communications links are contemplated. For example, PSTN links can be coupled to multiple switches at several points within the topology and softswitches can also be used.

The second site 100B similarly includes an endpoint (analog phone 121B) and a switch 130B. The configuration of the second site 100B demonstrates that a server is not required for each site. Switch 130B of the second site 100B can be managed by server 110 that is illustrated in the first site 100A. A call can involve more than one switch. For example, a call that originates from the PSTN 180 and terminates on an endpoint that is communicatively coupled to switch 130B of the second site 100B involves two switches: switch 130A of the first site 100A and switch 130B of the second site 100B. In addition, each switch 130 may be managed by a different server 110.

In one embodiment of the present invention, the network 190 is a partially public or a wholly public network such as the Internet. The network 190 can also be a private network or include one or more distinct or logical private networks (e.g., virtual private networks or wide area networks). Additionally, the communication links to and from the network 190 can be wireline or wireless (i.e., terrestrial- or satellite-based transceivers). In one embodiment of the present invention, the network 190 is an IP-based wide or metropolitan area network.

B. Server Architecture

Figure 2:
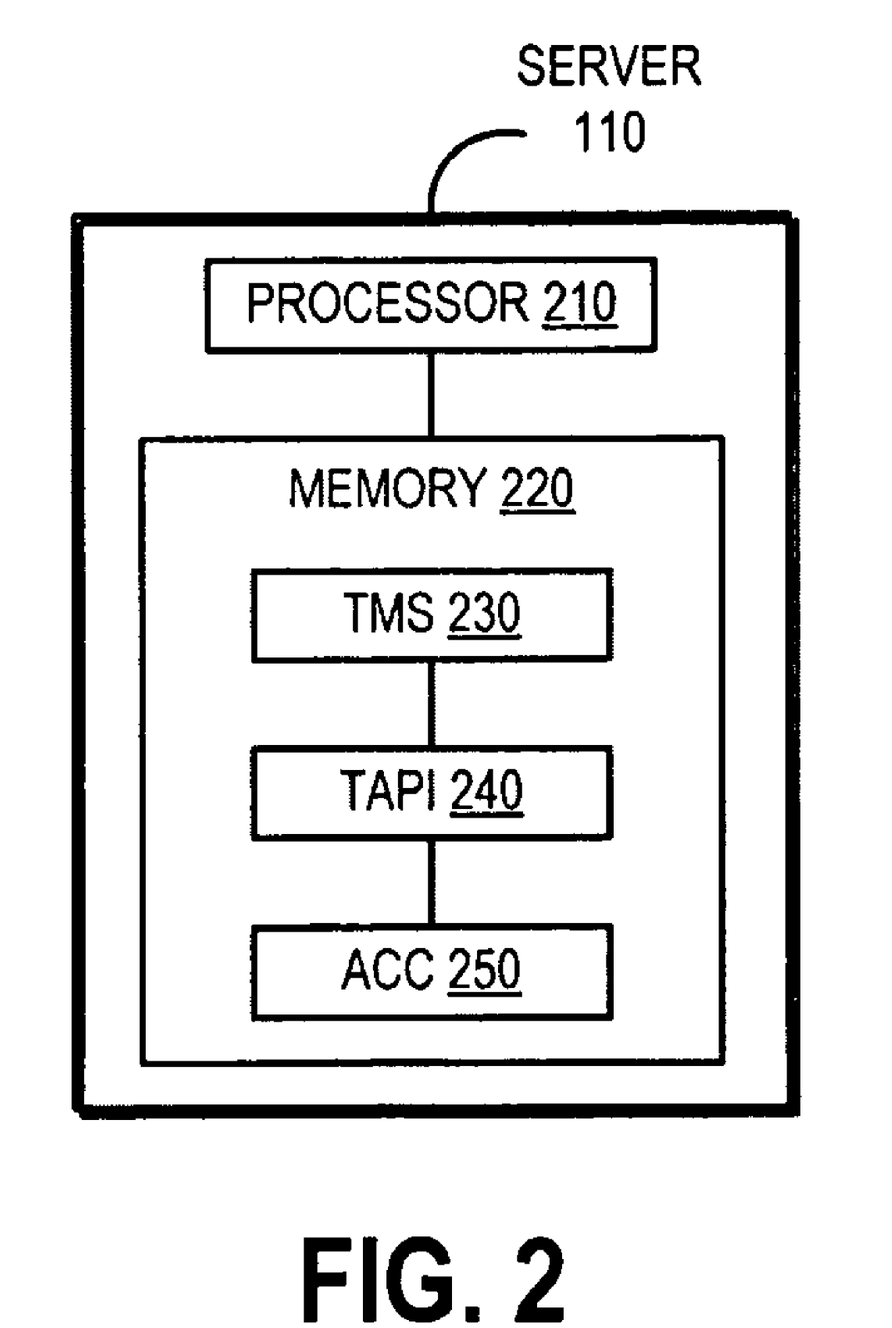
FIG. 2 is a diagram illustrating an exemplary server architecture according to one embodiment of the present invention.

FIG. 2 is a diagram illustrating an exemplary server architecture according to one embodiment of the present invention. In this embodiment, server 110 is configured to implement features or functions of the present invention. Server 110 includes a processor 210. The processor 210 can be a conventional processing device, such as a general-purpose microprocessor.

Server 110 also includes a memory 220. The memory 220 includes program instructions or functional units that implement features of the present invention. Specifically, the memory 220 includes a telephony management software (TMS) unit 230 and a telephony application programming interface (TAPI) unit 240.

In one embodiment, the memory 220 also includes one or more application units that interact with the TMS unit 230 (by using the TAPI unit 240) to enable a specific computer-integrated function. An application unit uses the TAPI unit 240 to exchange data with the TMS unit 230. The TMS unit 230 is able to communicate with and manage one or more switches. For example, with reference to FIG. 1, the TMS unit 230 included in the server 110 can manage the switches 130A, 130B. Through the TAPI unit 240, the TMS unit 230 presents an application with a computer-telephony integration (CTI) view of these switches 130A, 130B. This allows the application to manage the switches 130A, 130B. Such switches 130A, 130B can operate without an associated TMS unit 230 if CTI features are not being used.

C. Application Unit Architecture

In the illustrated embodiment, the server 110 includes one application unit—account code (ACC) unit 250. In general, the ACC unit 250 handles a request to make a call, prompts for an account code, and completes the call. The functionality of the ACC unit 250 will be further described below with reference to FIG. 4.

In one embodiment, ACC unit 250 is implemented as a service that is used by the TMS unit 230. Communication or data exchange between the TMS unit 230 and the ACC unit 250 is further described with reference to FIG. 3. Although ACC unit 250 is illustrated as executing on the server 110, ACC unit 250 may be distributed among computing devices as is known to one of skill in the art. For example, the functionality enabled by ACC unit 250 may be implemented in a client-server fashion by having the client (user's local system) perform some functions and the server (ACC unit) perform others.

Figure 3:
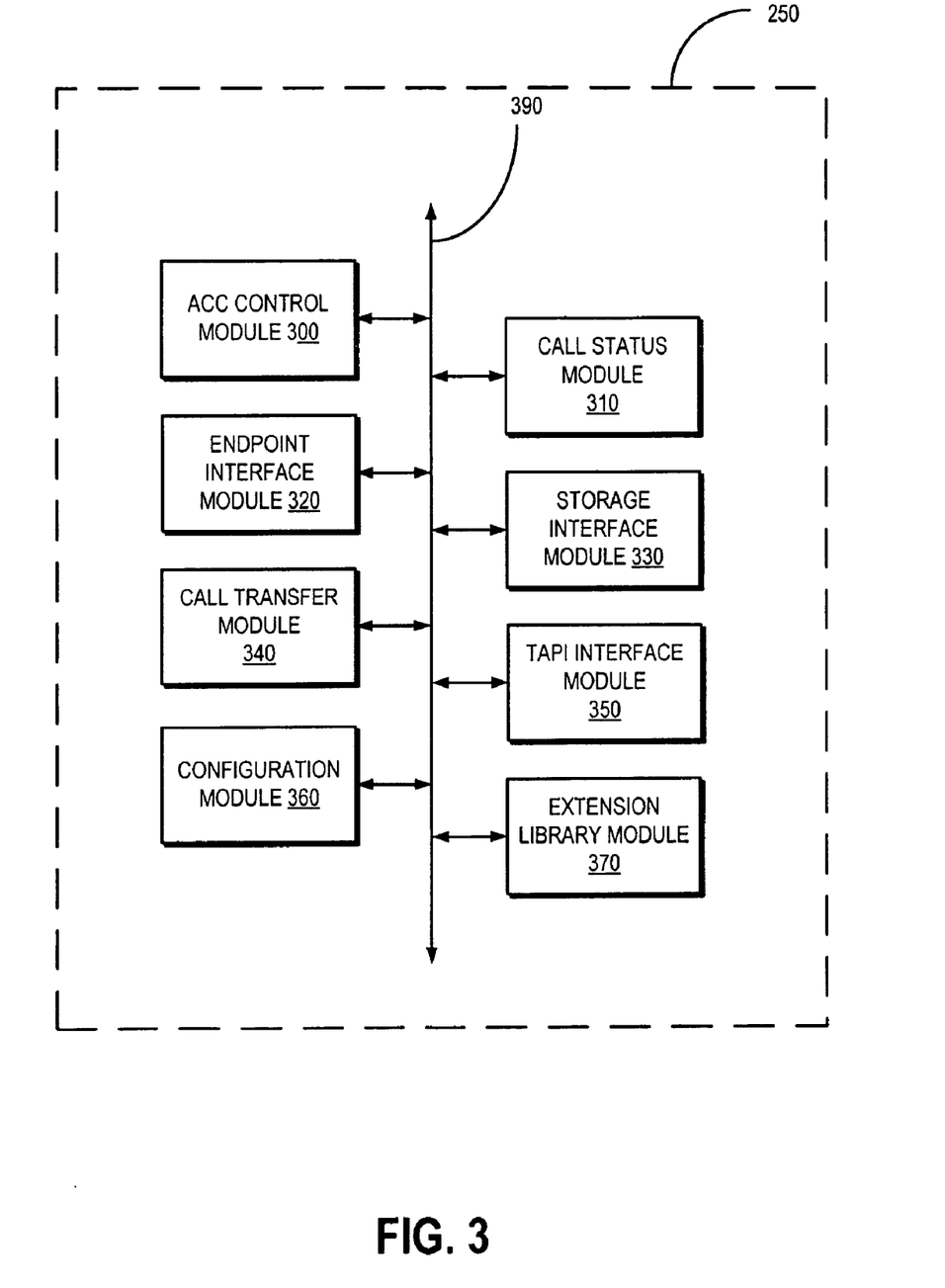
FIG. 3 is an illustration of one embodiment of the account code unit.

FIG. 3 is an illustration of one embodiment of the account code unit. Generally, ACC unit 250 includes several modules for receiving calls, prompting for account codes, and completing calls. In the illustrated embodiment, the ACC unit 250 includes an ACC control module 300, a call status module 310, an endpoint interface module 320, a storage interface module 330, a call transfer module 340, a TAPI interface module 350, a configuration module 360, and an extension library module 370. A data bus 390 communicatively couples each of the modules 300, 310, 320, 330, 340, 350, 360, 370.

The modules 300, 310, 320, 330, 340, 350, 360, 370 include program instructions that can be executed on, for example, processor 210 to implement the features or functions of the present invention. The modules 300, 310, 320, 330, 340, 350, 360, 370 are typically stored in a memory, such as memory 220. For server 110, the program instructions can be distributed on a computer readable medium or storage volume. The computer readable storage volume can be available via a public network, a private network, or the Internet. Program instructions can be in any appropriate form, such as source code, object code, or scripting code.

The ACC control module 300 centrally controls the operation and process flow of ACC unit 250, transmitting instructions and data to as well as receiving data from each module 310, 320, 330, 340, 350, 360, 370. Details of its operation will be discussed below with reference to FIG. 4.

The call status module 310 determines whether an account code is required or optional for a given call. In order to do this, the call status module 310 queries the TMS unit 230 through the TAPI interface module 350 and the TAPI unit 240. This gives the call status module 310 access to the call on the switch 130 itself. As previously described, the TAPI interface module 350 enables other modules to use the server's TAPI unit 240.

The endpoint interface module 320 sends data to and receives data from endpoints, such as analog phone 121A and IP phone 122, and devices running call manager software 150 that controls these endpoints. Endpoint interface module 320 communicates with a call manager 150 directly, while it communicates with an endpoint directly or via a switch 130, depending on the type of the endpoint. For example, endpoint interface module 320 communicates with IP phone 122 directly but communicates with analog phone 121A through switch 130A.

Data sent to an endpoint or a call manager 150 comprises information such as, for example, whether an account code is required or optional and, if an account code has been received, whether the code is valid or invalid. Data received from an endpoint comprises information such as, for example, an account code to use for the phone call.

The storage interface module 330 accesses information stored in storage device 140. As described above, storage device 140 contains account code information, including account codes and the names of customers associated with the account codes.

The call transfer module 340 completes a phone call by transferring it to the call's destination phone number.

The configuration module 360 provides information about how the ACC control module 300 should operate. For example, the configuration module 360 determines how long the ACC control module 300 should wait for an account code to be entered before the ACC control module 300 times out and how many times an invalid account code may be entered before a phone call is terminated. Lastly, the extension library module 370 provides common functions that are used by the other modules.

D. Methods

Figure 4:
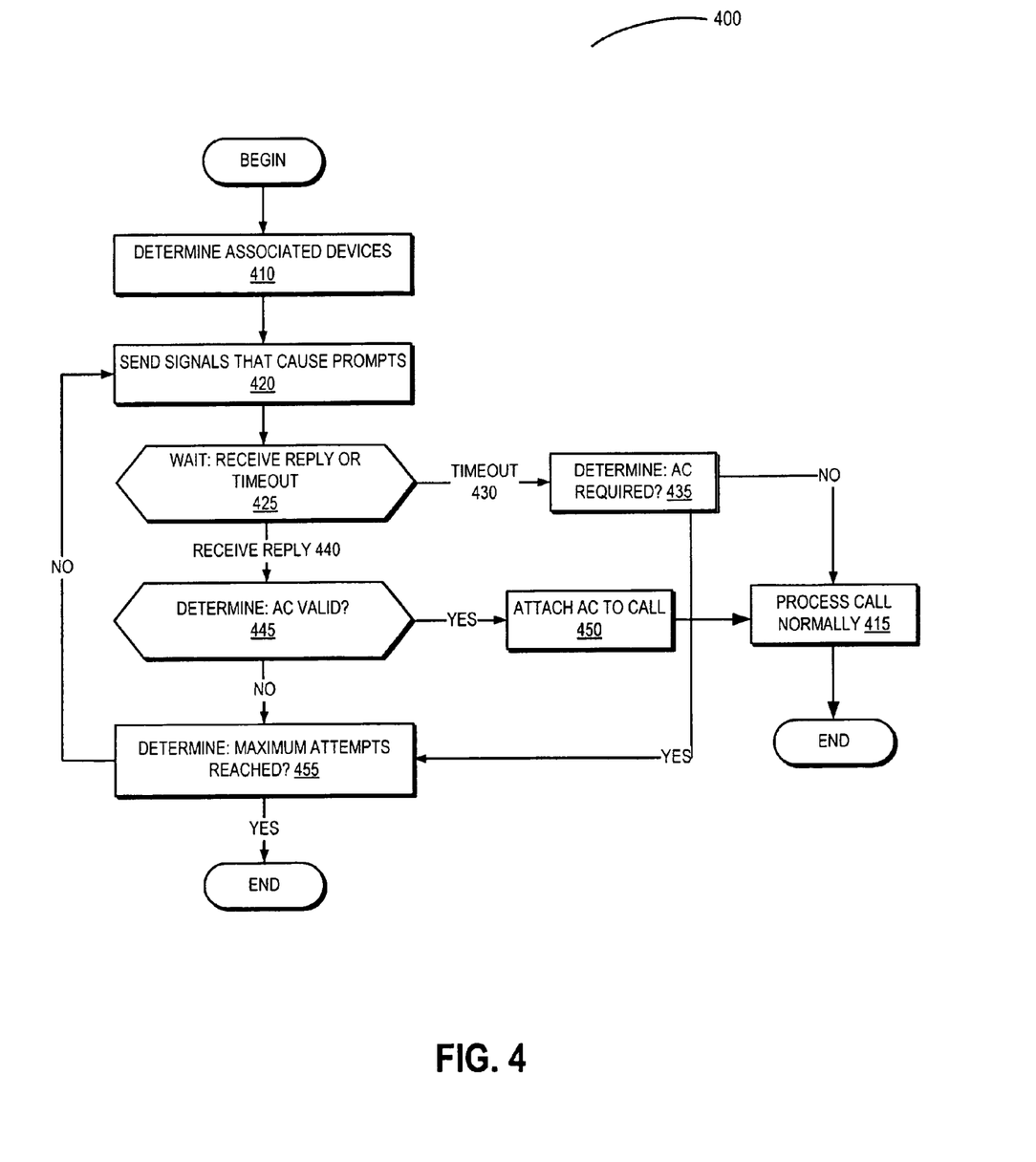
FIG. 4 illustrates a method performed by a server for handling a request to make a call, prompting for an account code, and completing the call according to one embodiment of the present invention.

Details of modules 300, 310, 320, 330, 340, 350, 360, 370 will be further explained with reference to FIG. 4. FIG. 4 illustrates a method performed by a server for handling a request to make a call, prompting for an account code, and completing the call according to one embodiment of the present invention. The method 400 of FIG. 4 would be performed once for each call coming into a site. In one embodiment, different calls are handled in parallel.

Before the method 400 of FIG. 4 begins, a switch 130A in the local site 100A receives a request to make a call. The request is associated with a user. The switch 130 determines whether account codes are enabled for the call. If account codes are not enabled, then the switch 130 processes the call normally. If account codes are enabled, then the switch 130 diverts the call to the server 110 and method 400 begins.

The ACC control module 300 determines 410 which devices (endpoints and call managers 150) are associated with the user who initiated the call. The ACC control module 300 then sends 420 a signal to each of these devices, using the endpoint interface module 320. These signals may be identical or they may differ based on the destination device. These signals cause the devices to prompt the user for an account code and, in one embodiment, indicate whether an account code is required or optional.

In traditional telephony systems, only the device that was used to initiate the call prompts the user for an account code. In contrast, in one embodiment, the ACC control module 300 sends signals to multiple devices, including devices that were not used to initiate the call, causing the devices to prompt the user for input. The ACC control module 300 then instructs the endpoint interface module 320 to wait 425 for either a reply from a device or a timeout, whichever occurs first. In one embodiment, a reply indicates which device generated it.

In this way, a user can initiate a call on one device and then use a different device to enter an account code. For example, a user may want to initiate a call on an analog phone 121 because he plans to use the phone during the conversation. Then, when the user realizes that he must enter an account code, he can use a call manager 150 to search for the appropriate account code using a software account code directory. Once he has located the account code, he can merely click on it using the call manager 150, rather than entering the code into the analog phone 121 digit by digit. As another example, a user may initiate a call using a call manager 150 and then enter an account code using an IP-based phone 122.

If the endpoint interface module 320 times out first 430, then the ACC control module 300 instructs the call status module 310 to determine 435 whether an account code is required for the call. If an account code is not required, then the ACC control module 300 processes 415 the call normally using the call transfer module 340 and the method ends. If an account code is required, then the method passes to step 455, which is described below.

If a reply is received first 440, then the ACC control module 300 determines 445 whether the received reply contains a valid account code. The ACC control module 300 does this by using storage interface module 330 to check whether the storage device 140 contains the received account code. If multiple account codes are received (e.g., one account count from each device that prompted the user), then the ACC control module 300 checks the validity of each one, in the order that is was received, until it has found a valid one. If the received account code is valid, then the ACC control module 300 attaches 450 the account code to the phone call and sends a signal to the devices (that are associated with the user who initiated the call), using the endpoint interface module 320, that it no longer needs an account code. After a device has received this signal, it stops prompting the user for an account code. Then, the ACC control module 300 processes 415 the call normally using the call transfer module 340 and the method ends.

If the received account code is not valid, then the ACC control module 300 determines 455 whether the maximum number of attempts to enter a valid account code has been reached. If the maximum number has not been reached, then the method returns to step 420 and the ACC control module 300 again prompts 420 the devices for an account code using the endpoint interface module 320. If the maximum number has been reached, then the phone call is disconnected and the method ends.

Having described embodiments of a server with account code capability for distributed IP telephony systems (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

The invention claimed is:

1. A method for associating information with a call, the method comprising:
   receiving a request initiated by a user to make the call;
   determining one or more devices that are associated with the user;
   prompting, by sending one or more first signals to the one or more devices, the user to enter account information to associate with the call;
   receiving, from one of the one or more devices, a second signal comprising the account information; and
   associating the account information with the call.

2. The method of claim 1 wherein the format of the first signal is based on a device type of the one or more devices.

3. The method of claim 1, wherein the first signal indicates whether the information is required or optional.

4. The method of claim 1, wherein the second signal comprises an identifier of one of the one or more devices that are associated with the user.

5. The method of claim 1, comprising determining whether the received information is valid.

6. The method of claim 5, comprising responsive to having determined that the received information is valid, sending a third signal to one of the one or more devices, the third signal indicating that valid information has been received.

7. The method of claim 5, comprising responsive to having determined that the received information is invalid, terminating the call.

8. The method of claim 5, comprising responsive to having determined that the received information is invalid, prompting the user to enter information.

9. The method of claim 1, comprising prompting, by sending a third signal to one of the one or more devices, the user to enter information to associate with the call.

10. The method of claim 1, comprising receiving a third signal from one of the one or more devices, the third signal comprising a request for valid information.

11. The method of claim 1, comprising sending a third signal to one of the one or more devices, the third signal comprising valid information, responsive to having received a fourth signal from one of the one or more devices, the fourth signal comprising a request for valid information.

12. The method of claim 1, comprising transferring the call to a destination number of the call.

13. The method of claim 1, wherein one of the one or more devices is one of an analog phone, an Internet Protocol (IP) phone and a soft phone.

14. The method of claim 1, wherein one of the one or more devices is a call manager.

15. The method of claim 1, wherein the one or more devices include both a call manager and an endpoint.

16. The method of claim 14, wherein the call manager offers the user an interface through which the user may perform a call-related function.

17. The method of claim 1 wherein the information the user is prompted for is an authorization code for an automated message system.

18. The method of claim 1 wherein the information the user is prompted for is an account code.

19. The method of claim 16 wherein the interface includes a graphical user interface for the user to enter the information the user is prompted for.

20. The method of claim 19 wherein the graphical user interface includes a list from which the user can choose the information to be entered.

21. The method of claim 20 wherein the list can be filtered based on a received character such that each remaining entry in the list comprises the received character.

22. A method for associating information with a call, the method comprising:
receiving, by a server, a request to make the call, the call having been initiated by a user on a first device;
prompting, by sending a signal to the first device, by an endpoint interface module, the user to enter information to associate with the call;
receiving, by the endpoint interface module, from a second device, a signal comprising such information; and
associating, by a storage interface module, the information with the call.

23. The method of claim 22 further comprising:
communicating, by a control module, with the endpoint interface module and the storage interface module.

24. A method for associating an account code with a call, the method comprising:
receiving, by a server, a request to make the call, the call having been initiated by a user on a first device;
prompting, by sending a signal to the first device, by an endpoint interface module, the user to enter an account code to associate with the call;
receiving, by the endpoint interface module, from a second device, a signal comprising an account code; and
associating, by a storage interface module, the account code with the call.

25. The method of claim 24, further comprising:
communicating, by a control module, with the endpoint interface module and the storage interface module.

26. The method of claim 24, wherein the signal sent to the first device indicates whether the account code is required or optional.

27. The method of claim 24, wherein the signal received from the second device further comprises an identifier of the second device.

28. The method of claim 24, further comprising determining, by a storage interface module, whether the received account code is valid.

29. The method of claim 28, further comprising responsive to having determined that the received account code is valid, sending a signal to one of the first device and the second device, the signal indicating that a valid account code has been received.

30. The method of claim 28, further comprising responsive to having determined that the received account code is invalid, terminating the call.

31. The method of claim 28, further comprising responsive to having determined that the received account code is invalid, prompting the user to enter an account code.

32. The method of claim 24, further comprising prompting, by sending a signal to the second device, by a second prompting module, the user to enter an account code to associate with the call.

33. The method of claim 24, further comprising receiving, by a call status module, a signal from one of the first device and the second device, the signal comprising a request for one or more valid account codes.

34. The method of claim 24, further comprising sending, by the endpoint interface module, a signal to one of the first device and the second device, the signal comprising one or more valid account codes, responsive to having received a signal from one of the first device and the second device, the signal comprising a request for one or more valid account codes.

35. The method of claim 24, further comprising transferring the call to a destination number of the call.

36. The method of claim 24, wherein one of the first device and the second device is one of an analog phone, an Internet Protocol (IP) phone, and a software phone.

37. The method of claim 24, wherein one of the first device and the second device is running a software application that controls another device.

38. An apparatus for associating an account code with a call, the apparatus comprising:
a server, the server configured to receive a request to make a call, the call having been initiated by a user on a first device, the server further comprising:
an endpoint interface module, the endpoint interface module configured to prompt, by sending a signal to the first device, the user to enter an account code to associate with the call and configured to receive, from a second device, a signal comprising an account code;
a storage interface module, the storage interface module configured to associate the account code with the call.

39. The apparatus of claim 38 further comprising:
a control module, the control module coupled to and configured to communicate with the endpoint interface module and the storage interface module.

40. The apparatus of claim 38, wherein the storage interface module is further configured to determine whether the received account code is valid.

41. The apparatus of claim 38, further comprising a second endpoint interface module, the second endpoint interface module configured to prompt, by sending a signal to the second device, the user to enter an account code to associate with the call.

42. The apparatus of claim 39, wherein the control module is further coupled to and configured to communicate with the second endpoint interface module.

43. The apparatus of claim 38, further comprising a call status module, the call status module configured to receive a signal from one of the first device and the second device, the signal comprising a request for one or more valid account codes.

44. The apparatus of claim 39, wherein the control module is further coupled to and configured to communicate with the call status module.

45. The apparatus of claim 38, wherein the endpoint interface module is further configured to send a second signal to one of the first device and the second device, the second signal comprising one or more valid account codes, responsive to having received a first signal from one of the first device and the second device, the first signal comprising a request for one or more valid account codes.

* * * * *